UNITED STATES PATENT OFFICE.

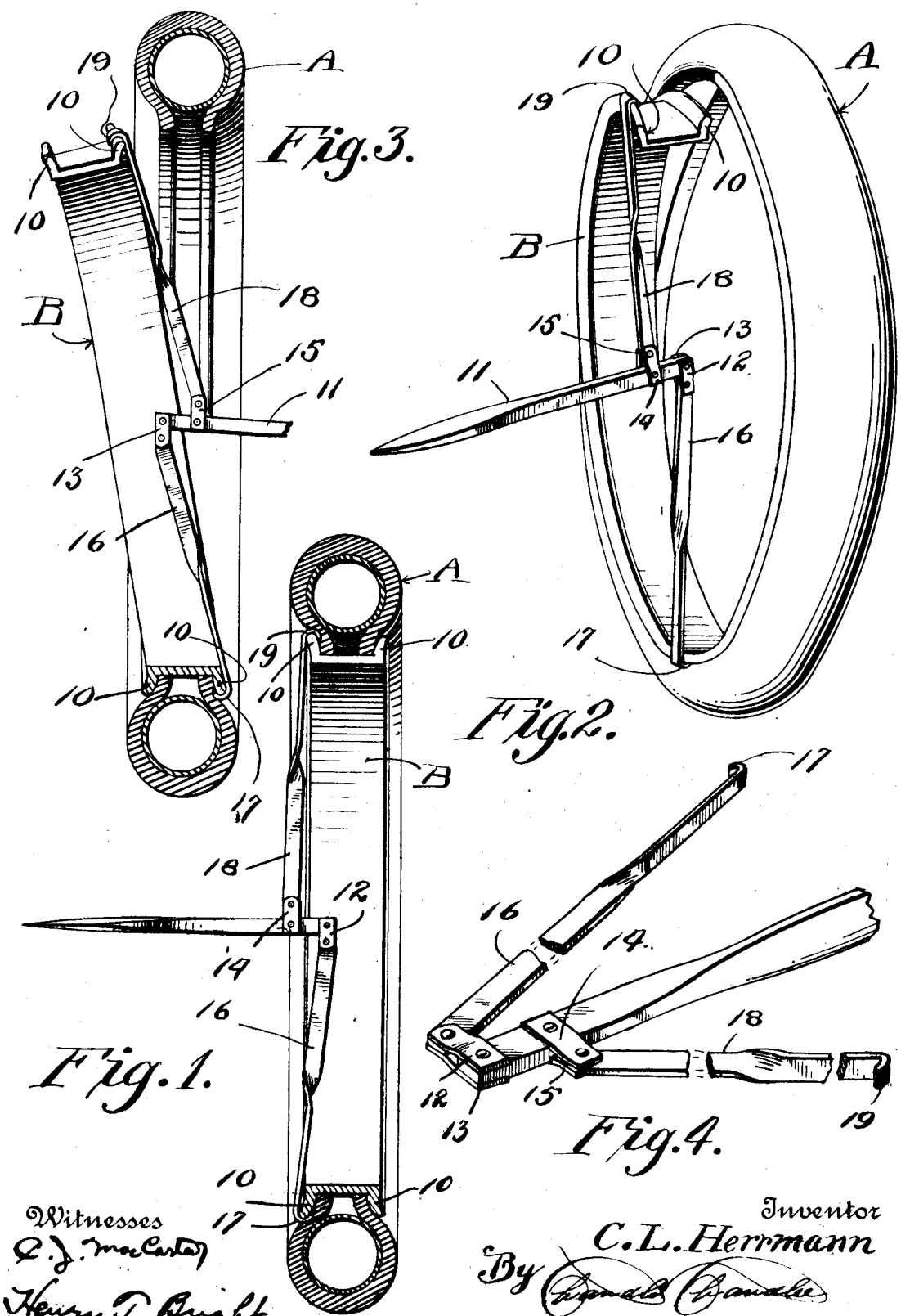

CARL L. HERRMANN, OF TORRINGTON, CONNECTICUT.

TOOL FOR DEMOUNTABLE RIMS.

1,132,845.  Specification of Letters Patent.  Patented Mar. 23, 1915.

Application filed November 25, 1912. Serial No. 733,514.

*To all whom it may concern:*

Be it known that I, CARL L. HERRMANN, a citizen of the United States, residing at Torrington, in the county of Litchfield, State of Connecticut, have invented certain new and useful Improvements in Tools for Demountable Rims; and I do hereby declare the following to be a full, clear, and exact description of the invention, such as will enable others skilled in the art to which it appertains to make and use the same.

This invention relates to tools and particularly to a tool for attaching and detaching demountable rims and tires to and from each other.

The object of the invention resides in the provision of a tool of the character named which will enable a demountable rim and tire to be attached to and detached from each other with facility and speed.

A further object of the invention resides in the provision of a tool of the character named which will be simple in construction, efficient in use and which may be manufactured at a very small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a section through a demountable rim and tire showing the tool applied. Fig. 2 a detail perspective view of a demountable rim and tire and showing the tool applied and operated to position the rim for disengagement from the tire. Fig. 3 a view similar to Fig. 1 showing the position of tool and rim just before the former is operated to bring the rim into proper relation to the tire. Fig. 4 a detail perspective view of the tool.

Referring to the drawings A indicates a pneumatic tire and B a demountable rim, said rim including the usual clencher flanges 10.

The tool is shown as comprising an operating lever or handle 11. Mounted upon one end of the lever 11 are laterally directed spaced ears 12 and 13, while additional spaced ears 14 and 15 are mounted upon the lever 11 just inward of the ears 12 and 13, said ears 14 and 15 being directed laterally of the lever 11 in a direction opposite to the ears 12 and 13. Pivoted between the ears 12 and 13 is an arm 16 the free end of which terminates in a hook 17. The arm 16 adjacent its outer end is given a quarter turn so that the hook 17 extends in the same general direction as the lever 11. Pivoted between the ears 14 and 15 is an arm 18 the free end of which terminates in a hook 19. This arm 18 is also given a quarter turn adjacent its outer end so as to dispose the hook 19 similarly to the hook 17.

To disengage a tire and demountable rim from each other through the medium of the tool it is only necessary to dispose the arms 16 and 18 at substantially right angles to the lever 11 and engage the hooks 17 and 19 over one of the flanges 10 of the rim B, care being taken to engage the hook 19 over the rim flange at a point adjacent one of the terminals of the rim. The free end of the lever 11 is then moved so as to draw the arms 16 and 18 toward each other. This will result in one of the ends of the rim B being drawn inwardly and laterally toward the lever 11 which will impart a substantially helical shape to the rim and permit of the tire A being readily disengaged from the rim as will be apparent.

To attach the tire A to the rim B it is only necessary to apply the tire as far as possible around the rim manually. This manual application of the tire will result in one of the ends of the rim B being forced laterally and in order to bring this end into proper relation to the tire it is only necessary to engage the hook 19 with the flange 10 which is disposed adjacent the tire at said end and the hook 17 with a diametrically opposite portion of said flange. The lever 11 is then operated to draw the laterally positioned portion of the rim into the plane of the tire and when the pressure upon the lever 11 is removed the rim will assume its proper relation to the tire.

What I claim is:—

A tool of the class described comprising an operating lever, a pair of laterally directed spaced ears rigidly mounted on opposite sides of said lever respectively and at one end of the latter, an arm having one end pivoted between said ears, a second pair of spaced ears rigidly mounted on opposite sides of said lever inwardly of the first named pair, an arm having one end pivoted between the second named ears and whereby said arms are both adapted to swing in the plane of movement of the lever, and hooks formed on the free ends of said arms respectively, said hooks extending away from the grip end of the lever and being constantly disposed in the common plane of the arms and lever.

In testimony whereof, I affix my signature, in the presence of two witnesses.

CARL L. HERRMANN.

Witnesses:
WILLARD A. RORABACK,
JOHN H. THOMPSON.